US010264295B2

(12) United States Patent
Dharssi et al.

(10) Patent No.: US 10,264,295 B2
(45) Date of Patent: Apr. 16, 2019

(54) EFFICIENT DELIVERY METHOD FOR DELIVERING ONLINE VIDEO WHERE IN-VIDEO IMAGES ARE ALTERED DYNAMICALLY BASED ON INTERNET DATA OF INDIVIDUAL VIEWER

(71) Applicant: IN SITU MEDIA CORPORATION, Vancouver (CA)

(72) Inventors: Fatehali Dharssi, Vancouver (CA); Ashley McKay, Vancouver (CA)

(73) Assignee: In Situ Media Corporation, Vancouver, BC (CA)

( * ) Notice: Subject to any disclaimer, the term of this patent is extended or adjusted under 35 U.S.C. 154(b) by 90 days.

(21) Appl. No.: 15/504,601

(22) PCT Filed: Aug. 21, 2015

(86) PCT No.: PCT/CA2015/050801
§ 371 (c)(1),
(2) Date: Feb. 16, 2017

(87) PCT Pub. No.: WO2016/026050
PCT Pub. Date: Feb. 25, 2016

(65) Prior Publication Data
US 2017/0238028 A1 Aug. 17, 2017

Related U.S. Application Data
(60) Provisional application No. 62/040,243, filed on Aug. 21, 2014.

(51) Int. Cl.
*H04N 21/44* (2011.01)
*H04N 21/81* (2011.01)
(Continued)

(52) U.S. Cl.
CPC ....... *H04N 21/23424* (2013.01); *G06Q 30/02* (2013.01); *H04N 21/2225* (2013.01);
(Continued)

(58) Field of Classification Search
CPC combination set(s) only.
See application file for complete search history.

(56) References Cited

U.S. PATENT DOCUMENTS

| 2011/0246661 A1 | 10/2011 | Manzari |
| 2013/0091521 A1 | 4/2013 | Phillips |
| 2013/0216206 A1* | 8/2013 | Dubin ...................... H04N 9/87 386/282 |

FOREIGN PATENT DOCUMENTS

WO 20130152439 A1 10/2013

OTHER PUBLICATIONS

Islam, M.D. Safiqul, "A HTTP Streaming Video Server with Dynamic Advertisement Splicing," Mar. 21, 2010, Chapter 4; pp. 27-37.
(Continued)

*Primary Examiner* — Nathan J Flynn
*Assistant Examiner* — Christen A Kurien
(74) *Attorney, Agent, or Firm* — Olympic Patent Works PLLC

(57) ABSTRACT

A system and method is presented that segregates portions of a video file into distinct sections based on whether the sections contain original content or modified content. For each segment, portion, section or scene with modified content, a compressed file is created which includes at least one instance of a set of frames which includes modified content. For some sections there may be two or more versions of modifications. These alternative versions may be compressed as a single distinct file. This permits efficient edge caching of video files with modified content, for example for
(Continued)

selective provision of alternative versions of the video file to various end users in a transmission efficient manner.

19 Claims, 1 Drawing Sheet

(51) Int. Cl.
*H04N 21/231* (2011.01)
*H04N 21/258* (2011.01)
*H04N 21/2343* (2011.01)
*H04N 21/234* (2011.01)
*G06Q 30/02* (2012.01)
*H04N 21/2225* (2011.01)
*H04N 21/845* (2011.01)

(52) U.S. Cl.
CPC . *H04N 21/23106* (2013.01); *H04N 21/23439* (2013.01); *H04N 21/25891* (2013.01); *H04N 21/812* (2013.01); *H04N 21/8456* (2013.01); *H04N 21/44016* (2013.01)

(56) References Cited

OTHER PUBLICATIONS

Harmonic: "Over the Top State of Affairs," May 22, 2014, pp. 7-9; 21-24.
European Search Report, dated Oct. 12, 2017.

* cited by examiner

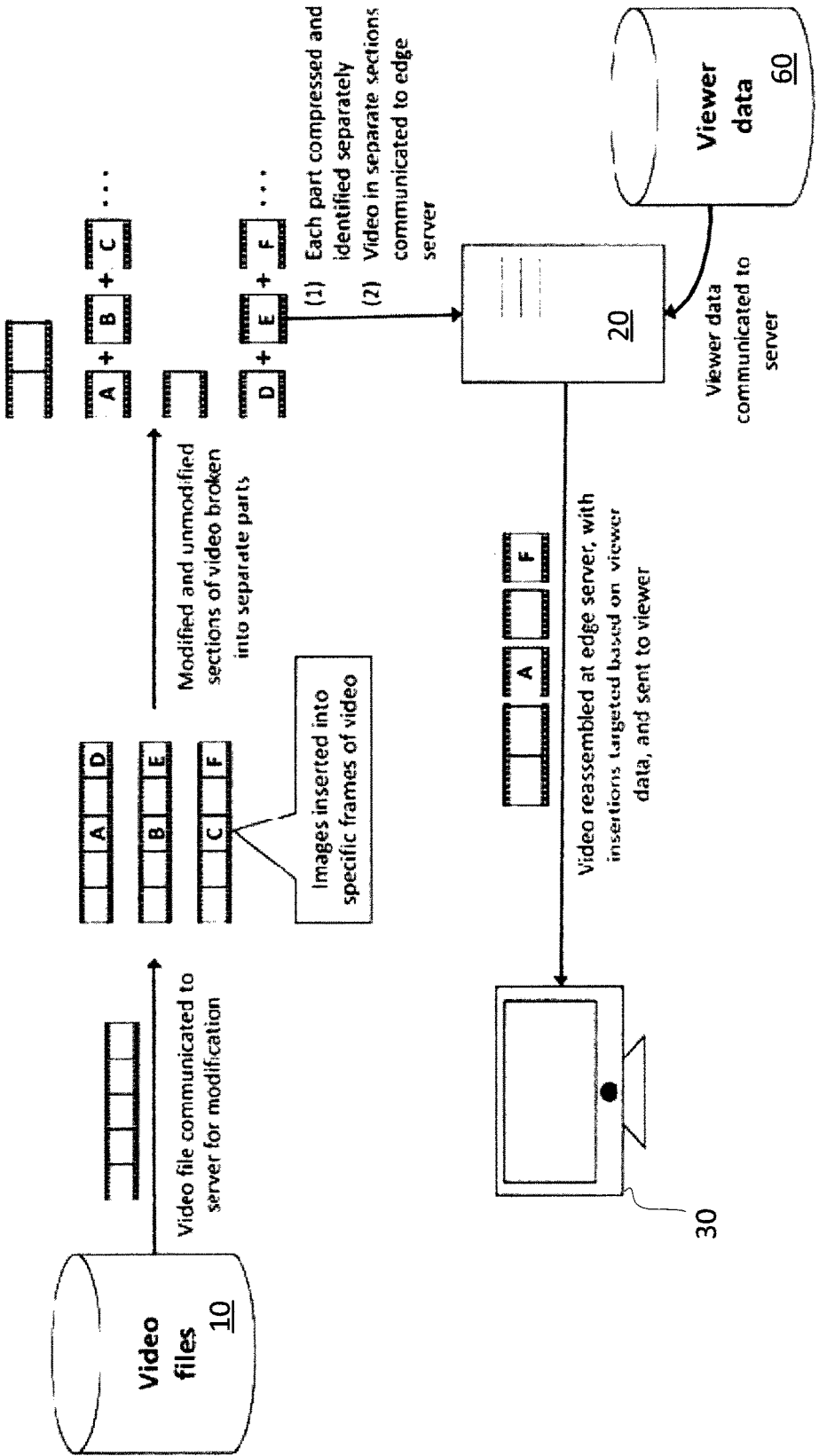

EFFICIENT DELIVERY METHOD FOR DELIVERING ONLINE VIDEO WHERE IN-VIDEO IMAGES ARE ALTERED DYNAMICALLY BASED ON INTERNET DATA OF INDIVIDUAL VIEWER

RELATED APPLICATIONS

This application claims the benefit of U.S. Provisional Patent Application No. 62/040,243 filed Aug. 21, 2014, which is hereby incorporated by reference in its entirety.

FIELD OF THE INVENTION

This invention related to the field of providing online video to viewers, and more particularly to delivering modified content in such video.

BACKGROUND OF THE INVENTION

The methods employed in the prior art for delivering online video to viewers on large video networks do not cater to in-video dynamic image changes. The dynamic changes to a video create new composite video frames within the video by adding or altering new image content. This dynamic property can be used to create viewer specific distinctive content so that changes to the video may be different for different viewers.

Although internet video is highly compressed to reduce transmission and storage cost, the compression techniques focus on eliminating similar data regions both within a frame and across multiple frames. Accordingly, it can be difficult to decompress a video to its original state to facilitate accurate image region modification.

For example, advertising media may require a product image to be placed in an online video in post-production. Product images may require alteration depending on a viewer's preference to ensure, for example, that one viewer is shown a can of Coke while another may be shown a can of Pepsi in the video being downloaded or played. This altered content may be automatically selected based on Internet data from a viewer's product purchase history or internet browsing preference data.

1. Compression:

Traditionally video has been a data intensive use of media, and consumes large quantities of processing time, data storage space, and distribution transmission bandwidth cost. Thus, video is almost always compressed to reduce cost.

A video typically displays 24 to 30 frame images a second to give the illusion of movement, but not everything in the current frame image moves in the following frame. Accordingly, some compression algorithms store incremental changes in several frames in addition to compressing the current image frame. This often eliminates approximately similar regions that are within the same frame and sequences of frames. Compression techniques can reduce file sizes for raw video by a large factor, and use several methods to improve degraded image appearance from the compression processes.

2. Deduplication:

While compression reduces data redundancy within a file, deduplication is a technique used to eliminate substrings of identical data repeated across numerous files. Deduplication stores only one instance of such a data substring, while subsequent instances of this data substring merely reference the saved copy. This process is often applied to transmission and storage operations to reduce data transfer redundancies.

However, many online videos are often cached (i.e. stored temporarily) on a local content delivery server when it is first viewed by a local user. This edge caching is often done to optimize operational efficiency, as transmission costs can be significantly higher than the cost of data storage. For example, when a viewer first watches a specific video on YouTube this video would be transmitted from the YouTube central server to a local server and then onto the first viewer. Thereafter, such video would be cached (or stored) at the local servers for future viewing by additional viewers on the same network or in a close geographical region.

SUMMARY OF THE INVENTION

A method of operation in a system including at least one processor and at least one nontransitory processor-readable media communicatively coupled to the at least one processor and which stores at least one of processor-executable instructions or data to post-process video files with modified content for efficient delivery may be summarized as including: for a first video file comprising a plurality of frames of a first video, for each of a number of scenes in the first video having modified content, compressing at least one set of contiguous frames of the first video having modified content as respective compressed files by the at least one processor; for each of a number of scenes in the first video having unmodified content, which scenes temporally occur before or following each of the scenes in the first video having modified content, compressing at least one set of contiguous frames of the first video having unmodified content as respective compressed files by the at least one processor, the compressed files corresponding to the scenes of the first video with unmodified content distinct from one another, and the compressed files corresponding to the scenes of the first video with unmodified content distinct from the compressed files corresponding to the scenes of the first video with modified content; providing all of the compressed files for the first video file to at least one server, the at least one server geographically remote from the at least one processor; and providing information to the at least one server that indicates, for each of the compressed files a relative temporal position of the scene to which the compressed file corresponds in a timeline of the first video.

The method may further include: identifying a first scene comprising a first set of contiguous frames in the first video file for modification; and creating the first set of contiguous frames having modified content based at least in part on the first set of contiguous frames in the first video file for modification by the at least one processor. Creating the first set of contiguous frames having modified content may include inserting image data representing a first image into each frame of a first copy of the first set of frames by the at least one processor. Creating the first set of contiguous frames having modified content may further include removing image data representing an image of a product to be replaced from each frame of the first copy of the first set of frames by the at least one processor. Inserting image data representing a first image into each frame of a first copy of the first set of frames may include inserting the image data representing the first image into each frame of the first copy of the first set of frames to appear at a location in each frame of the first set of frames where the image of the product to be replaced appeared by the at least one processor. The method may further include: for the first scene, creating a second set of contiguous frames having modified content based at least in part on the first set of contiguous frames in the first video file for modification by the at least one processor. Creating a second set of contiguous frames having modified content may include: inserting image data representing a second image into each frame of a first copy of the first set of frames by the at least one processor, the second image different than the first image. Compressing at least one set of contiguous frames of the first video having modified content as respective compressed files may include for the first scene compressing the first and the second sets of contiguous frames as a single compressed file by the at least one processor. The method may further include: for the first scene, creating a third set of contiguous frames having modified content based at least in part on the first set of contiguous frames in the first video file for modification by the at least one processor. Compressing at least one set of contiguous frames of the first video having modified content as respective compressed files may include, for the first scene compressing the first, the second, and the third sets of contiguous frames as a single compressed file by the at least one processor. The method may further include: identifying a second scene comprising a second set of contiguous frames in the first video file for modification; and for the second scene, creating a second set of contiguous frames having modified content based at least in part on the second set of contiguous frames in the first video file for modification by the at least one processor. Compressing at least one set of contiguous frames of the first video having modified content as respective compressed files may include, for the first scene compressing the first set of contiguous frames as a first compressed file by the at least one processor, and for a second scene compressing the second set of contiguous frames as a second compressed file by the at least one processor, the second compressed file distinct from the first compressed file. Compressing at least one set of contiguous frames of the first video having modified content as respective compressed files may include compressing at least two respective sets of contiguous frames having modified content for the first scene of the video by the at least one processor, and may further include associating each of the at least two respective sets of contiguous frames with respective information regarding the respective the modified content by the at least one processor. Associating each of the at least two respective sets of contiguous frames with respective information regarding the respective the modified content may include providing information indicative of at least one of a product, demographic, geographic locale, or Web browsing characteristic to which the respective modified content relates. The method may include, for each of at least one of the scenes in the first video having modified content, compressing at least one set of contiguous frames of the first video having unmodified content along with the at least one set of contiguous frames of the first video having modified content as one compressed file by the at least one processor.

A system to prepare video files for efficient delivery may be summarized as including: at least one processor; and at least one nontransitory processor-readable medium communicatively coupled to the process and which stores at least one of processor-executable instructions or data, the processor which in use: performs any of the above acts.

A method of operation in a system including at least one processor and at least one nontransitory processor-readable media communicatively coupled to the at least one processor and which stores at least one of processor-executable instructions or data to efficiently delivery post-processed video files with modified content video may be summarized as including: for a first user and for a first video file comprising a plurality of frames of a first video, for each of a number of scenes in the first video having modified content, identifying a corresponding compressed file which includes the modified content by the at least one processor; determining whether the corresponding compressed file includes more than one option for the modified content by the at least one processor; in response to determining that the corresponding compressed file includes more than one option for the modified content, determining which option to present to the first user by the at least one processor; and in response to determining that the corresponding compressed file includes more than one option for the modified content, determining which option to present to the first user by the at least one processor by the at least one processor.

The method may further include: for the first user and for the first video file comprising the plurality of frames of the first video, for at least one scene in the first video having unmodified content that occurs in a timeline of the video before the at least one scene having modified content, identifying a corresponding compressed file which includes the unmodified content by the at least one processor; providing a plurality of contiguous frames of the first video having the unmodified content to the first user. The method may further include: for the first user and for the first video file comprising the plurality of frames of the first video, for at least one scene in the first video having unmodified content that occurs in a timeline of the video after the at least one scene having modified content, identifying a corresponding compressed file which includes the unmodified content by the at least one processor; providing a plurality of contiguous frames of the first video having the unmodified content to the first user by the at least one processor. Determining which option to present to the first user may include determining at least one of a product, demographic, geographic locale, or Web browsing characteristic to which the respective modified content relates.

A system to prepare video files for efficient delivery may be summarized as including: at least one processor; and at least one nontransitory processor-readable medium communicatively coupled to the process and which stores at least one of processor-executable instructions or data, the processor which in use: performs any of the above acts.

BRIEF DESCRIPTION OF THE DRAWINGS

FIG. 1 is a block diagram showing an embodiment of the method according to the invention.

DETAILED DESCRIPTION

With transmission costs being significantly higher than storage costs, the origin server on which the video originates compares large amounts of content data in regions where a particular video was compressed and deduplicated before transmission. If the dynamic image content regions of the video are known, these regions may be efficiently pre-allocated and tracked prior to storage or transmission of the video. The compression aware application level pre-deduplication processing taught herein thus only requires storage of the changed sections and the initial pre-compressed dynamically format video on the edge servers. This approach does not necessitate alteration of the encoding format of existing compression algorithms, and thus allows efficient dynamic changes to static video content.

Therefore, the structured compressed video 10, as shown in FIG. 1, on an edge server may have dynamic image content regions altered as the video is transmitted to a local viewer. In this approach the video file is divided into at least three sections i.e.

1. the section of the video before any changes are inserted (referred to hereafter as the "Pre"),
2. the section of the video wherein changes occur which may include several sections if there are several separate sections where image changes are made to the original video (referred to hereafter as the "Changed"), and
3. the section of the video after all changes are inserted (referred to hereafter as the "Post").

Thereafter, the three section types are compressed and deduplicated, and then transmitted to the remote server. These video versions may be stored as separate files or resources, or abstracted as content versions. When a viewer requests to view a video, the Pre section is combined with the Post section and the appropriate Changed sections, which may be based on the viewer's Internet data, and then all the sections together are transmitted to the viewer. Thus the Changed sections in such a transmission would be different for a viewer that is shown a Coke can versus another viewer that is shown a Pepsi can.

Sections (which may be one scene, more than one scenes, or part of a scene) may be visually distinct sections or scenes or may be contextually distinct sections or scenes (e.g., two different levels of a training video or video games with differing sections intended for different users on the internet), or may be visually and contextually distinct sections or scenes. Additionally, this method also allows efficient archiving by compressing two or more binary similar structured data copies of separate video versions (one with a Pepsi can and another with a Coke can). The compressed archive could thus store only the additional changes needed by the dynamically modified sections, and thereby further reduce local resource consumption.

It should be noted that if there are multiple changes to be made in one or more sections of a video, then there may be multiple Changed sections. Additionally, when a video is shown to a viewer, one viewer may only be shown one changed or inserted image while another viewer may be shown multiple changed sections or inserted images. As an example if a video is being used for product placement purposes and in a particular video it is decided that several products should be placed together in one section or one or more products placed in multiple sections, then this shall create multiple Changed sections depending on the internet data associate with a viewer.

Alternatively, this can also be achieved by compressing uncompressed copies of two or more separate videos (one with a Pepsi can, another with a Coke can and more if there are more changed sections) and then deduplicating the compressed files of these two videos whereby only the changes between the videos of inserted images is automatically separated after the deduplication process.

A number of methods will now be described. Methods according to the invention may include additional acts or operations, eliminate some acts or operations, and may even perform acts or operations in a different order than set out below. Furthermore each method may include steps, acts or operations from other disclosed methods. Thus, these exemplary methods or algorithms are not intended to be limiting.

Post-Processing System Operation to Post-Process Video Files for Efficient Content Delivery A method of operation in a system to post-process video files with modified content for efficient delivery is described.

The system includes at least one processor and at least one nontransitory processor-readable media communicatively coupled to the at least one processor and which stores at least one of processor-executable instructions or data. The processor may take any of a variety of forms, for example including one or more: microprocessors (single core, multicore), digital signal processors (DSPs), graphical processing units (GPUs), or field programmable gate arrays (FPGAs). The at least one nontransitory processor-readable media may take any of a variety of forms, for example including one or more: nonvolatile media (e.g., read only memory or ROM, FLASH memory, disk-based media such as magnetic disks and optical disks, tape-based media), volatile media (e.g., static or dynamic random access memory), etc.

In operation, the system performs the following acts or operations for each of a number of video files, which each including a plurality of frames of a first video. For each of a number of sections in the first video having modified content with respect to the original content of the video, the system compresses at least one set of contiguous frames of the first video having modified content as respective compressed files. For each of a number of sections in the first video having unmodified content, which scenes temporally occur before or following each of the scenes in the first video having modified content, the system compresses at least one set of contiguous frames of the first video having unmodified content as respective compressed files by the at least one processor. The compressed files corresponding to the sections of the first video with unmodified content are distinct from one another. The compressed files corresponding to the scenes of the first video with unmodified content are distinct from the compressed files corresponding to the scenes of the first video with modified content.

The system then provides all of the compressed files for the first video file to at least one server (e.g., an edge server 20 in a content delivery network or CDN). The at least one server 20 may be geographically remote from the at least one processor of the system.

The system also provides information to the at least one server that indicates, for each of the compressed files a relative temporal position of the scene to which the compressed file corresponds in a timeline of the first video. This allows the various frames from the compressed files to be put back into a correct order by the server 20, for delivery to an end user or end user device 30.

In operation, the system may identify a first section including a first set of contiguous frames in the first video file for modification and create the first set of contiguous frames having modified content based at least in part on the first set of contiguous frames in the first video file for modification by the at least one processor. For example, the system may create the first set of contiguous frames having modified content by inserting image data representing a first image into each frame of a first copy of the first set of frames. In some instances, the system may create the first set of contiguous frames having modified content by further removing image data representing an image of a product to be replaced from each frame of the first copy of the first set of frames. Inserting image data representing a first image into each frame of a first copy of the first set of frames may include inserting the image data representing the first image into each frame of the first copy of the first set of frames to appear at a location in each frame of the first set of frames where the image of the product to be replaced appeared, for example Section "A" as shown in FIG. 1. Thus, the at least one processor may replace images of a first object (e.g., can of COKE®) in a series of frames of the video with images of a second object (e.g., can of PEPSI®, bottle of BUD-WEISER®), located in the same location in the frame of video as the first object.

The system may create and package alternative sets of modified content for any given scene. Thus, the system (e.g., at least one processor of the system) may for the first scene, create a second set of contiguous frames having modified content based at least in part on the first set of contiguous frames in the first video file for modification, for example section "B" as shown in FIG. 1. This may include inserting image data representing a second image into each frame of a first copy of the first set of frames where the second image different than the first image. The system may further, for the first scene, creates a third set of contiguous frames having modified content based at least in part on the first set of contiguous frames in the first video file for modification, for example section "C" as show in FIG. 1. Thus, a first modification may insert a first brand of electronics (e.g., smartphone, tablet computer, laptop computer), a second modification insert a second brand of electronics, and the third modification insert a third brand of electronics.

The system may advantageously package the various alternatives for a given scene with modified content as a single, distinct file. For example, the system may, for the first scene, compress the first and the second sets of contiguous frames as a single compressed file, for example as shown in the Pre in FIG. 1. Also for example, for the first scene, the system may compress the first, the second, and the third sets of contiguous frames as a single compressed file.

The system may create and package alternative sets of content for one, two or more portions or scenes in the video. For example, the system may identify a second section comprising a second set of contiguous frames in the first video file for modification. The system may, for the second section, create a second set of contiguous frames having modified content based at least in part on the second set of contiguous frames in the first video file for modification, as shown as "D" in FIG. 1.

The system may, for the first section, compress the first set of contiguous frames as a first compressed file, and for a second section compress the second set of contiguous frames as a second compressed file. The second compressed file is distinct from the first compressed file.

The system may compress at least two respective sets of contiguous frames having modified content for the first scene of the video, and may further logically associate in nontransitory storage each of the at least two respective sets of contiguous frames with respective information regarding the respective modified content. For example, the system may associate each of the at least two respective sets of contiguous frames with respective information regarding the respective modified content by providing information indicative of at least one of a product, demographic, geographic locale, or Web browsing characteristic to which the respective modified content relates. This can facilitate placing sections of a video back together in the appropriate order, as well as facilitate selection of appropriate modifications for a given user.

For each sections in the first video having modified content, the system may compress at least one set of contiguous frames of the first video having unmodified content along with the at least one set of contiguous frames of the first video having modified content as one compressed file. Thus, the compress file for a given scene may include a copy of the section without modification, and one or more copies of the section with respective modifications. For instance, a first section may include an image of a first type of appliance of a first brand. The compressed file corresponding to the first section may include the frames of video with the image of the first type of appliance of the first brand. The compressed file corresponding to the first section may also include frames of video with the image of the first type of appliance of the first brand replaced with an image of the first type of appliance but of a second brand, different than the first brand. The compressed file corresponding to the first section may also include frames of video with the image of the first type of appliance of the first brand replaced with images of the first type of appliance but of a third brand, the third brand different than the first and the second brands. The compressed file corresponding to the first scene may additionally or alternatively include frames of video with the image of the first type of appliance of the first brand replaced with an image of a second type of appliance, different from the first type of appliance. The second type of appliance may be of the first brand, or alternative of a different brand than the first brand.

Edge Server Operation

Once video files have been delivered to a remote server, for instance an edge server 20 of a CDN which caches the video files, the server 20 will assemble or stream the video files to users 30, typically on demand. The server 20 selects various modified scenes, for example based on viewer data 60, which may include user demographics, or other user specific or advertiser specific information.

For each of a number of users and for each of a number of video files which include a plurality of frames of a first video, the server 20, which may contain one or more processors, one or more nontransitory processor-readable media which stores at least one of processor-executable instructions or data, as well as video files, performs one or more of the following acts or operations.

For each of a number of sections in a first video having modified content, identifying a corresponding compressed file which includes the modified content. Determine whether the corresponding compressed file includes more than one option for the modified content (e.g., a first section "A" with first product inserted, first section "B" with second product inserted, etc.).

In response to determining that the corresponding compressed file includes more than one option for the modified content, the server determines which option to present to the first user.

For example, for a first user and for a first video file including the plurality of frames of the first video, for at least one section in the first video having unmodified content that occurs in a timeline of the video before the at least one section having modified content, the server 20 identifies a corresponding compressed file which includes the unmodified content. The server provides or causes to be provided a plurality of contiguous frames of the first video having the unmodified content to the first user.

Also for example, for a first user and for a first video file including the plurality of frames of the first video, for at least one scene in the first video having unmodified content that occurs in a timeline of the video after the at least one section having modified content, the server 20 identifies a corresponding compressed file which includes the unmodified content. The server provides or causes to be provided a plurality of contiguous frames of the first video having the unmodified content to the first user.

The server 20 may determine which option to present to the first user based at least in part on one or more of a viewer data 60, product, demographic, geographic locale, or Web browsing characteristic to which the respective modified content relates.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not be read as limited by the disclosure.

The invention claimed is:

1. A method of operation in a system comprising a processor and a nontransitory processor-readable media communicatively coupled to the processor and which stores processor-executable instructions to post-process video files with modified content for efficient delivery, the method comprising:
providing a first video file comprising a plurality of frames of a first video,
for each of a number of sections of the first video having modified content, compressing at least one set of contiguous frames of the first video having modified content as respective compressed file;
for each section of the first video having unmodified content, which section temporally occurring in the video before or following a sections of the first video having modified content, compressing at least one set of contiguous frames of the first video having unmodified content as respective compressed file by the at least one processor, the compressed files corresponding to the section of the first video with unmodified content distinct from compressed files of other sections of the video;
providing all of the compressed files for the first video file to a server, the server geographically remote from the processor; and
providing information to the server that indicates, for each of the compressed files a relative temporal position of the section to which the compressed file corresponds in a timeline of the first video.

2. The method of claim 1, further comprising:
identifying a first section comprising a first set of contiguous frames in the first video for modification; and
creating the first set of contiguous frames having modified content based at least in part on the first set of contiguous frames in the first video for modification by the processor.

3. The method of claim 2 wherein creating the first set of contiguous frames having modified content comprises inserting image data representing a first image into each frame of a first copy of the first set of frames by the processor.

4. The method of claim 3 wherein creating the first set of contiguous frames having modified content further comprises removing image data representing an image of a product to be replaced from each frame of the first copy of the first set of frames by the processor.

5. The method of claim 4 wherein inserting image data representing a first image into each frame of a first copy of the first set of frames includes inserting, by the processor, the image data representing the first image into each frame of the first copy of the first set of frames to appear at a location in each frame of the first set of frames where the image of the product to be replaced appeared.

6. The method of claim 3, further comprising:
for the first section, creating, by the processor, a second set of contiguous frames having modified content based at least in part on the first set of contiguous frames in the first video file for modification.

7. The method of claim 6 wherein creating a second set of contiguous frames having modified content comprises: inserting image data representing a second image into each frame of a first copy of the first set of frames by the processor, the second image different than the first image.

8. The method of claim 7 wherein compressing at least one set of contiguous frames of the first video having modified content as respective compressed files comprises for the first section compressing the first and the second sets of contiguous frames as a single compressed file by the processor.

9. The method of claim 3, further comprising:
for the first section, creating a third set of contiguous frames having modified content based at least in part on the first set of contiguous frames in the first video file for modification by the processor.

10. The method of claim 9 wherein compressing at least one set of contiguous frames of the first video having modified content as respective compressed files includes, for the first section compressing the first, the second, and the third sets of contiguous frames as a single compressed file by the processor.

11. The method of claim 2, further comprising:
identifying a second section comprising a second set of contiguous frames in the first video file for modification; and
for the second section, creating a second set of contiguous frames having modified content based at least in part on the second set of contiguous frames in the first video file for modification by the processor.

12. The method of claim 11 wherein compressing at least one set of contiguous frames of the first video having modified content as respective compressed files includes, for the first section compressing the first set of contiguous frames as a first compressed file by the processor, and for a second section or scene compressing the second set of contiguous frames as a second compressed file by the processor, the second compressed file distinct from the first compressed file.

13. The method of claim 1 wherein compressing at least one set of contiguous frames of the first video having modified content as respective compressed files includes compressing at least two respective sets of contiguous frames having modified content for the first section of the video by the at least one processor, and further comprising associating each of the at least two respective sets of contiguous frames with respective information regarding the respective the modified content by the processor.

14. The method of claim 13 wherein associating each of the at least two respective sets of contiguous frames with respective information regarding the respective modified content includes providing information indicative of at least one of a product, demographic, geographic locale, or Web browsing characteristic to which the respective modified content relates.

15. The method of claim 1 wherein for each of at least one of the sections or scenes in the first video having modified content, compressing at least one set of contiguous frames of the first video having unmodified content along with the at least one set of contiguous frames of the first video having modified content as one compressed file by the at least one processor.

16. A method of operation in a system comprising a processor and a nontransitory processor-readable media communicatively coupled to the processor and which stores processor-executable instructions to deliver post-processed video files with modified content, the method comprising:

providing a first video file comprising a plurality of frames of a video, for each of a number of sections in the video having modified content, identifying a compressed file which includes the modified content;

determining whether the compressed file includes more than one option for the modified content;

in response to determining that the compressed file includes more than one option for the modified content, determining which option to present to a user.

17. The method of claim 16, further comprising:

for at least one section in the first video having unmodified content that occurs in a timeline of the video before the section having modified content, identifying a corresponding compressed file which includes the unmodified content;

providing a plurality of contiguous frames of the video having the unmodified content to the user.

18. The method of claim 16, further comprising:

for at least one section in the video having unmodified content that occurs in a timeline of the video after the section having modified content, identifying a corresponding compressed file which includes the unmodified content;

providing a plurality of contiguous frames of the video having the unmodified content to the user.

19. The method of claim 16 wherein determining which option to present to the first user includes determining at least one of a product, demographic, geographic locale, or Web browsing characteristic to which the modified content relates.

* * * * *